May 8, 1962   R. L. WOZNIAK   3,033,701
INFRARED TRANSMITTING OPTICAL ELEMENT
Filed May 20, 1957
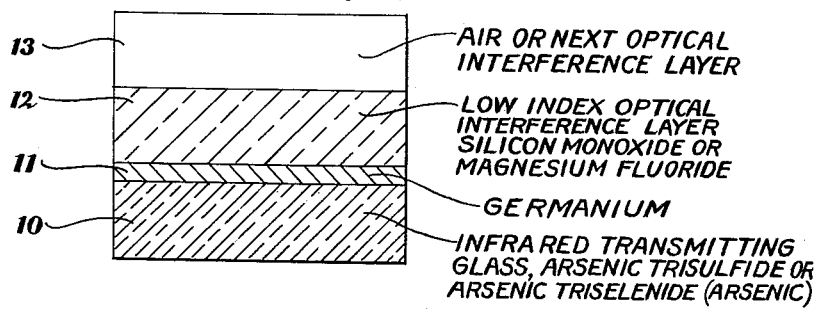
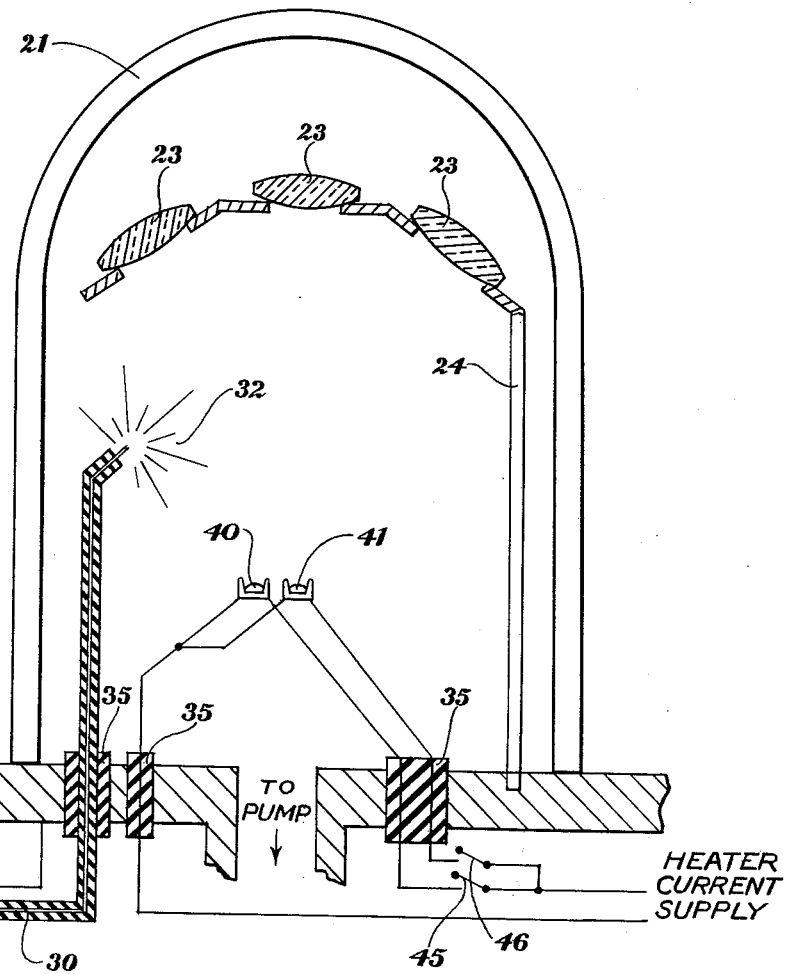
Raymond L. Wozniak
INVENTOR.

United States Patent Office 3,033,701
Patented May 8, 1962

3,033,701
INFRARED TRANSMITTING OPTICAL ELEMENT
Raymond L. Wozniak, Rochester, N.Y., assignor to Eastman Kodak Company, Rochester, N.Y., a corporation of New Jersey
Filed May 20, 1957, Ser. No. 660,419
2 Claims. (Cl. 117—33.3)

This invention relates to infrared transmitting lenses, windows, prisms, and the like, with optical interference layers thereon. Optical interference layers include single reflection-reducing layers and multiple layer coatings which act as filters transmitting certain colors and reflecting others.

The object of the invention is to overcome the special difficulty which comes up when placing a low index layer on the usual infrared transmitting glasses of the arsenic trisulfide and arsenic triselenide or other arsenic-selenide types, such as arsenic triselenide alloyed with 20% or 30% metallic arsenic. A range of 0 to 35% metallic arsenic is known to be satisfactory in such glasses. Techniques are well known for putting durable low index layers on ordinary glass. Magnesium fluoride and silicon monoxide are commonly used for this purpose. The glass base is sometimes preheated or treated with a glow discharge or treated with electric bombardment, before the low index layer is applied thereto. These procedures have a cleaning effect on the glass. The use of chromium as a subbing has been suggested for this same purpose. However, none of these techniques work for the infrared glass and low index coatings here mentioned; the adherence of the coating to the glass is unsatisfactory.

According to the present invention, a low index coating is made durable for this particular purpose by applying an extremely thin coating of metallic germanium on the surface of the element as a subbing, before the low index layer is applied thereto. The simplest and most common method of measuring the thickness of a metallic coating is in terms of optical density; in the present case the germanium is coated to an optical density between .005 and .80. The simplest satisfactory procedure is to clean the sulfide or selenide glass by a high intensity glow discharge before applying the germanium. As is customary, the glow discharge is applied at a pressure between 15 and 20 micron Hg and the pressure is then pumped down to below .1 micron Hg for evaporating the germanium. The low index layer is then evaporated directly onto the germanium at the lower pressure. This procedure is completely satisfactory in the case of silicon monoxide, however, with magnesium fluoride a still further improvement is obtained by a second glow discharge after the germanium subbing has been applied. This involves raising the pressure to a level at which the glow discharge can be sustained and then lowering the pressure again for the evaporation of the magnesium fluoride.

The objects and advantages of the invention will be more fully understood from the following description when read in connection with the accompanying drawing in which:

FIG. 1 is a greatly enlarged cross section of part of an optical element according to the present invention; and FIG. 2 is a schematic view of the vacuum evaporating equipment used in practicing the present invention.

In FIG. 1 an infrared transmitting glass element 10 consists of arsenic trisulfide or arsenic triselenide, alloyed with 0 to 35% As (arsenic). A germanium layer 11 is coated thereon to a thickness whose optical density is between .005 and .80. Germanium absorbs highly in the visible part of the spectrum but transmits highly in the infrared. Hence, relatively thin coatings may have a visual density as high as .80 The range .005 to .80 is thus a narrow one as far as actual thickness is concerned. A low index optical interference layer 12 of silicon monoxide or magnesium fluoride is coated onto the germanium. This optical interference layer is one-quarter wavelength thick and in contact with air when used as a single reflection-reducing coating, but it may have a different thickness and be in contact with the next optical interference layer, usually of high index, in any of the multilayer systems. The next layer is indicated at 13 in FIG. 1. The present invention is concerned with a method of attaching a low index layer to an infrared transmitting glass and is exactly the same whether the layer is used alone or as part of a multilayer system.

In FIG. 2 an evaporating chamber is made up of a base plate 20 and a bell jar 21 which may be evacuated by a suitable pump and held at any desired pressure within the ranges used for glow discharge or evaporation. Lenses 23 of arsenic trisulfide, for example, are supported on a suitable support 24 to receive layers evaporated onto their under surfaces. To clean the surfaces of the lenses a high intensity glow discharge 32 is provided through a conductor 30 which is at high potential relative to the base plate 20 which is grounded through lead 31. The high potential lead and all other electrical leads are insulated from plate 20 by insulators 35 in the usual way. In the present arrangement two evaporator sources are shown. Metallic germanium 40 held in one of the evaporators is melted and then evaporated by electrical current which flows when the switch 45 is closed. After a suitable amount of germanium is deposited on the lens 23 the switch 45 is opened and the switch 46 is closed to evaporate silicon monoxide 41 from the other heater unit. Alternatively, magnesium fluoride may be evaporated in place of the silicon monoxide 41. To insure adequate cleaning, the glow discharge 32 is produced by a potential exceeding 1500 volts for a period of time exceeding 2 minutes. The pressure during the glow discharge is maintained between 15 and 20 microns Hg. The pressure is then lowered to below .1 micron and the low index material 41 is then evaporated.

Thus a very simple procedure solved a very difficult problem.

I claim:
1. The method of coating low index optical interference layers onto an element of arsenic glass selected from the group consisting of arsenic trisulfide, arsenic triselenide and arsenic triselenide alloyed with less than 35% arsenic metal comprising placing the element in a vacuum chamber; cleaning said element with a bright glow discharge bombardment produced by a potential exceeding 1500 volts for a period of time exceeding two minutes, evaporating metallic germanium onto the element at a pressure between .02 and .1 micron Hg and then evaporating an optical interference layer of silicon monoxide onto the germanium.

2. The method of coating low index optical interference layers onto an element of arsenic glass selected from the group consisting of arsenic trisulfide, arsenic triselenide and arsenic triselenide alloyed with less than 35% arsenic metal comprising placing the element in a vacuum chamber, cleaning said element with a bright glow discharge bombardment produced by a potential exceeding 1500 volts for a period of time exceeding two minutes, evaporating metallic germanium onto the element at a pressure between .02 and .1 micron Hg, raising the pressure in the chamber to between .1 and .3 micron Hg, bombarding the germanium layer with a similar bright glow discharge for a period of time exceeding one minute and then evaporating an optical interference layer of magnesium fluoride onto the germanium at a pressure between .02 and .1 micron Hg.

References Cited in the file of this patent
UNITED STATES PATENTS

| | | |
|---|---|---|
| 2,660,925 | Turner | Dec. 1, 1953 |
| 2,750,832 | Morgan | June 19, 1956 |
| 2,834,689 | Jupnik | May 13, 1958 |